United States Patent Office 3,280,146
Patented Oct. 18, 1966

3,280,146
ARALKYL POLYHALOTHIACYCLOOLEFINS AND METHOD FOR THE PREPARATION THEREOF
Louis Schmerling, Riverside, Ill., assignor to Universal Oil Products Company, Des Plaines, Ill., a corporation of Delaware
No Drawing. Filed July 5, 1963, Ser. No. 293,179
19 Claims. (Cl. 260—327)

This invention relates to novel compositions of matter comprising aralkyl polyhalothiacycloolefins. More particularly, the invention relates to aralkyl polychlorothiacycloolefins which are prepared by condensing an alkyl aromatic compound containing at least one hydrogen on an alpha-carbon atom of a saturated carbon atom attached to the aromatic nucleus with a polyhalothiacycloolefin in which chlorine atoms are attached to all doubly-bonded carbon atoms in the ring.

The compounds of the present invention which comprise novel compositions of matter and which are prepared by a process hereinafter set forth in greater detail, will find a wide variety of uses in the chemical field. Heretofore the use of many insecticides has had a beneficial effect upon controlling various insects which are harmful to both animals and plants. However, due to the continued use of these insecticides many insects have now built up a tolerance or immunization towards certain types of insecticides with the result that the compounds have lost their effectiveness in combating the encroachment of various insects upon nature. Therefore, other types of compounds possessing insecticidal activity must be found which will overcome the built in resistance of the insects to the older, well known insecticidal compositions of matter. Compounds of the type prepared by the process of the present invention will possess insecticidal properties, especially against houseflies. In addition, the compounds of the present invention may also be used as intermediates in the preparation of other insecticidal compositions of matter, as additives for lubricants, as intermediates for the preparation of pharmaceuticals, resins, rubber vulcanizers, etc.

It is therefore an object of this invention to provide a process for the preparation of certain novel compositions of matter.

A further object of this invention is to provide a process for the preparation of novel compositions of matter comprising aralkyl polyhalothiacycloalkenes.

Taken in its broadest aspect one embodiment of this invention resides in a process for the preparation of an aralkyl polyhalothiacycloolefin which comprises condensing an alkyl aromatic compound containing at least one hydrogen atom on an alpha-carbon atom of a saturated carbon atom attached to the aromatic nucleus with a polyhalothiacycloolefin containing chlorine atoms on all doubly-bonded ring carbon atoms in the presence of a free radical generating catalyst at condensation conditions, and recovering the desired aralkyl polyhalothiacycloolefin.

A further embodiment of this invention is found in a process for the preparation of an aralkyl polyhalothiacycloolefin which comprises condensing toluene with a polyhalothiacycloolefin containing chlorine atoms on all doubly-bonded carbon atoms in the presence of a free radical generating catalyst at a pressure in the range of from about atmospheric to about 100 atmospheres and at a temperature in the range of from about 50° to about 300° C., said temperature being at least as high as the decomposition temperature of said free radical generating catalyst, and recovering the desired aralkyl polyhalothiacycloolefin.

Yet another embodiment of this invention is found in an aralkyl polychlorothiacycloolefin, in which there is an aralkyl group on a doubly-bonded carbon atom and chlorine atoms on all other doubly-bonded carbon atoms.

A specific embodiment of this invention resides in a process for the preparation of an aralkyl polyhalothiacycloolefin which comprises condensing toluene with 2,3,4,5-tetrachlorothiophene in the presence of di-tert-butyl peroxide at a temperature in the range of from about 130° to about 200° C. and at a pressure in the range of from atmospheric to about 100 atmospheres, and recovering the desired 3-benzyl-2,4,5-trichlorothiophene.

Another specific embodiment of this invention is found in 3-(p-methylbenzyl)-2,4,5,6-tetrachloro-4H-thiopyran.

Other objects and embodiments will be found in the following further detailed description of this invention.

As hereinbefore set forth, it has now been discovered that novel compositions of matter comprising aralkyl polyhalothiacycloolefins may be prepared by condensing an alkyl aromatic hydrocarbon with a polyhalothiacycloolefin. The alkyl aromatic hydrocarbons which are utilizable as starting materials in this process are characterized by having at least one hydrogen atom on the saturated alpha-carbon atom of a hydrocarbon group attached to the nucleus. Thus, the aromatic hydrocarbon can be represented as follows:

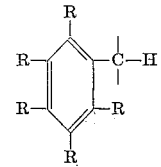

in which the substituents designated by the letter R in the hereinabove set forth formula may be selected from the group consisting of hydrogen, alkyl, aryl, cycloalkyl, alkaryl and aralkyl radicals. The free valences may be attached to hydrogen atoms, one of them may be attached to a hydrogen atom and the other may be attached to an alkyl group, they both may be attached to alkyl groups or form part of a cycloalkane ring, one of them may be attached to a hydrogen atom and the other may be attached to a ring or form part of a ring attached to a different nuclear carbon atom, or one may be attached to an alkyl group and the other to a cycloalkane ring, etc. Suitable aromatic hydrocarbons include toluene, ortho-xylene, meta-xylene, para-xylene, ethylbenzene, 1,2,3-trimethylbenzene, 1,2,3-trimethylbenzene, 1,3,5-trimethylbenzene, ortho-ethyltoluene, meta-ethyltoluene, para-ethyltoluene, n-propylbenzene, iso-propylbenzene, para-isopropyltoluene, n-butylbenzene, isobutylbenzene, sec-butylbenzene, cyclohexylbenzene, etc. Tertiary-butyl benzene and similar compounds in which the alpha methyl carbon atom does not have at least one hydrogen atom attached thereto are inoperative and thus are excluded from the scope of this invention. Likewise, compounds such as benzene, naphthalene, etc. are inoperative. Higher molecular weight alkylaromatic hydrocarbons, such as those produced by the alkylation of aromatic hydrocarbons as benzene or toluene, with olefinic polymers, are also suitable, provided, of course, that the alpha methyl carbon atom contains at least one hydrogen atom. In addition, it is also contemplated within the scope of this invention that the aromatic hydrocarbons having attached to a nuclear carbon atom a carbon atom of a saturated hydrocarbon group to which last named carbon atom is attached at least one hydrogen atom may also include polycyclic compounds such as alkyl naphthalenes, examples of which include 1-methylnaphthalene, 2-methylnaphthalene, 1,2-dimethylnaphthalene, 1-ethylnaphthalene, 2-ethylnaphthalene, 1,2-diethylnaphthalene, etc.; aromatic hydrocarbons containing both a benzene ring and a saturated ring such as 1,2,3,4-tetrahydronaphthalene (Tetralin), indane, etc.

The polyhalothiacycloolefins which comprise the other starting materials in the process of this invention are characterized by the fact that chlorine atoms are attached to all doubly-bonded carbon atoms. The term "polyhalothiachloroolefin" as used in the present specification and appended claims will refer to both polyhalothiacycloalkenes and polyhalothiacycloalkadienes. Suitable compounds of this type include 2,3-dichloro-4,5-dihydrothiophene,
2,3-dichloro-4-methyl-4,5-dihydrothiophene,
2,3,4-trichloro-4-methyl-4,5-dihydrothiophene,
2,3,4,5-tetrachloro-4,5-dihydrothiophene,
2,3-dichloro-4,5-dimethyl-4,5-dihydrothiophene,
2,3-dichloro-4-fluoro-4,5-dihydrothiophene,
2,3-dichloro-4,5-difluoro-4,5-dihydrothiophene,
2,3,4,5-tetrachlorothiophene,
2,3-dichloro-6-methyl-5,6-dihydro-4H-thiopyran,
2,3-dichloro-5,6-dimethyl-4,5-dihydro-4H-thiopyran,
2,3-dichloro-6-fluoro-5,6-dihydro-4H-thiopyran,
2,3-dichloro-5,6-difluoro-5,6-dihydro-4H-thiopyran,
2,3,6-trichloro-5,6-dihydro-4H-thiopyran,
2,3,5,6-tetrachloro-5,6-dihydro-4H-thiopyran,
2,3,4-trichloro-5-methyl-5,6-dihydro-4H-thiopyran,
2,3,4,5,6-pentachloro-4H-thiopyran,
2,3,4,5,6-pentachloro-2H-thiopyran,
5,6-dichloro-3,4-dihydro-2H-thiopyran,
5,6-dichloro-3-methyl-3,4-dihydro-2H-thiopyran,
5,6-dichloro-3,4-dimethyl-2H-thiopyran,
3,5,6-trichloro-3,4-dihydro-2H-thiopyran,
3,4,5,6-tetrachloro-3,4-dihydro-2H-thiopyran,
3,4,5,6-tetrachloro-3,4-dimethyl-3,4-dihydro-2H-thiopyran,
5,6-dichloro-3,4-dimethyl-3,4-dihydro-2H-thiopyran,
3,5,6-trichloro-3-methyl-3,4-dihydro-2H-thiopyran,
5,6-dichloro-3-fluoro-3,4-dihydro-2H-thiopyran,
5,6-dichloro-3,4-difluoro-3,4-dihydro-2H-thiopyran,
2,3,4,5,6-pentachloro-3,4-dihydro-2H-thiopyran, etc.

As is noted from the above examples of polyhalothiacyclo olefins, it is necessary that each of the doubly-bonded carbon atoms in the thiacycloolefin ring contain a chlorine atom. As long as this requirement is fulfilled, the other carbon atoms may contain similar or dissimilar halogen radicals as well as alkyl radicals, examples of this being the methyl-substituted and fluorine-substituted compounds hereinabove set forth.

It is to be understood that the aforementioned alkyl aromatic hydrocarbons containing at least one hydrogen on an alpha-carbon atom of a saturated carbon atom attached to the aromatic nucleus and polyhalothiacycloolefins containing chlorine atoms attached to each of the doubly-bonded carbon atoms are only representatives of the class of compounds which may be used, and that the process of the present invention is not necessarily limited thereto.

The catalysts that may be used in the process of the present invention are those which are capable of forming free radicals under the reaction conditions. These include diazonium compounds, metal alkyls and peroxy compounds. Peroxy compounds contain the bi-valent radical

which decomposes to form free radicals which initiate the general reaction of the present invention. Examples of such peroxy compounds are the persulfates, perborates and percarbonates of ammonium and of the alkali metals; peracetic acid, persuccinic acid, dimethyl peroxide, diethyl peroxide, di-tert-butyl peroxide, dipropyl peroxide, acetyl benzoyl peroxide, propionyl peroxide, butyryl peroxide, lauroyl peroxide, benzoyl peroxide, tetralin peroxide, urea peroxide, tert-butyl perbenzoate, tert-butyl hydroperoxide, methylcyclohexyl hydroperoxide, 2,4 - dicchlorobenzoyl peroxide, methyl ethyl ketone peroxide, cyclohexanone peroxide, cumene hydroperoxide, diisopropylbenzene hydroperoxide, paramenthane hydroperoxide, isopropyl percarbonate, etc. The organic peroxy compounds constitute a preferred class of catalysts for use in this invention. Mixtures of peroxy compound catalysts may be employed or the peroxy compound catalysts may be utilized in admixture with various diluents as catalysts for the process of this invention. Thus organic peroxy compounds which are compounded commercially with various diluents for use as free radical generating catalysts may be used and include benzoyl peroxide compounded with calcium sulfate, benzoyl peroxide compounded with camphor, benzoyl peroxide compounded with hydrogenated terphenyls, benzoyl peroxide compounded with stearic acid, benzoyl peroxide compounded with dibutyl phthalate, methyl ethyl ketone peroxide in dimethyl phthalate, cyclohexanone peroxide with dibutyl phthalate, acetyl peroxide in dimethyl phthalate, etc. Only catalytic amounts (less than stoichiometric amounts) need be used in the process.

In selecting a particular reaction temperature for use in the process of the present invention, two considerations must be taken into account. First, sufficient energy by means of heat must be applied to the reaction system so that the reactants, namely, the selected aromatic hydrocarbon and polyhalothiacycloolefin, will be activated sufficiently for condensation to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-tert-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitable activated state for condensation. When the half life of the free radical generating catalyst is greater than 10 hours, radicals are not generated at a sufficient rate to cause the reaction of the process of the present invention to go forward at a detectable rate. Thus the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus, it is within the skill of one familiar with the art to select the particular temperature needed for any particular catalyst. Generally the operating temperature does not exceed the temperature at which the half life is not more than 10 hours by more than about 150° C. since the free radical generating catalysts decompose rapidly under such conditions. However, in some instances temperatures as high as 300° C. may be utilized, for example, when a reactor is charged with the desired polyhalothiacycloolefin and the free radical generating catalyst in solution in the desired alkylaromatic hydrocarbon is introduced under and by means of pressure as a liquid under the surface of the polyhalothiacycloolefin maintained at the high temperature. The half life of tert-butyl perbenzoate is less than 10 hours at about 110° C. and accordingly when this peroxy compound is used as the catalyst for this process, the operating temperature is from about 110° C. to about 300° C., but generally not greater than about 265° C. An operating temperature of from about 130° to about 300° C. is used with a di-tert-butyl peroxide, and from about 75° to about 300° C., but generally not greater than about 225° C. with benzoyl peroxide. Little advantage is gained if the temperature is too high even though the reactants tend to become more activated in the presence of the free radical generating catalyst decomposing at a high rate since decomposition of the polyhalothiacycloolefin takes place at a temperatures above 300° C.

Although pressures of up to 100 atmospheres may be utilized, the reaction preferably takes place in liquid phase and thus the pressure will preferably range from about atmospheric to about 100 atmospheres such that a substantial proportion of the reactants is in the liquid phase. Pressure is not an important variable in the process of this invention. However, because of the low boiling points of some of the reactants, it is necessary to utilize pressure withstanding equipment to insure liquid phase conditions. In batch type operations, it is often desirable to utilize pressure withstanding equipment, to charge the reactants and catalyst to the vessel, and to pressure the vessel with 10, or 30, or 50 or more atmospheres of an inert gas such as nitrogen. This helps to insure the presence of liquid phase conditions. However, when the mole quantity of reactants is sufficient, the pressure which they themselves generate at the temperature utilized is sufficient to maintain the desired phase conditions. Nitrogen is also conveniently utilized when a glass liner is used along with pressure withstanding equipment. Since the nitrogen is pressured into the vessel prior to heating, it tends to maintain the reactants within the glass liner and thus aids in their removal from the reaction vessel after the passage of the desired period of time at the reaction temperature selected.

The concentration of the catalyst employed in this process may vary over a rather wide range but for reasons of economy, it is desirable to use low concentrations of catalyst, such as from about 0.1% to about 20% of the total weight of the polyhalothiacycloolefin and aromatic hydrocarbon charged to the process. The reaction time may be within the range of less than one minute to several hours, depending upon temperature and half life of the free radical generating catalyst, as set forth hereinabove. Generally, contact times of at least 10 minutes are preferred.

The process of this invention may be effected in any suitable manner and may comprise either a batch or continuous type operation. For example, when utilizing a batch type operation a quantity of the aromatic hydrocarbon of the type hereinbefore set forth and the free radical generating catalyst is placed in a reactor provided with heating and mixing devices. Following this the polyhalothiacycloolefin is added and the reactor heated to the predetermined reaction temperature, said temperature being dependent as hereinbefore set forth, upon the particular free radical generating catalyst which is utilized. The contents of the reactor are thoroughly admixed while heating the reactor. Upon completion of the desired reaction time, the reactor and contents thereof are cooled to room temperature and the desired condensation product is separated and recovered by conventional means such as fractional distillation under reduced pressure, etc.

The process of this invention may also be effected in a continuous type manner. When this method of operation is used, the alkyl aromatic hydrocarbon and the polyhalothiacycloolefin are continuously charged to a reaction zone which is maintained at the proper operating conditions of temperature and pressure. In addition, the free radical generating catalyst is also charged to the reactor through separate means or, if so desired, may be admixed with one or both of the starting materials prior to entry into said reactor and charged thereto in a single stream. Upon completion of the desired residence time, the reactor effluent is continuously withdrawn. The desired condensation products are separated from the reactor effluent and the unconverted starting materials may be recycled to the reaction zone as a portion of the feed stock. Inasmuch as the unreacted starting materials are usually lower boiling than the condensation products, they are readily recoverable by conventional means such as fractionation for the purposes of recycle. The condensation products which have been separated from the unreacted starting materials are then purified and recovered by conventional means hereinbefore set forth.

As an illustration of the process of this invention, the condensation of alkyl aromatic hydrocarbons containing at least one hydrogen atom on an alpha-carbon atom of a saturated carbon atom attached to the aromatic nucleus and the polyhalothiacyclooefin containing a chlorine atom on each of the doubly-bonded carbon atoms is set forth in the following equation. This equation shows the condensation of toluene with 2,3,4,5-tetrachlorothiophene in the presence of di-tert-butyl peroxide with the evolution of hydrogen chloride.

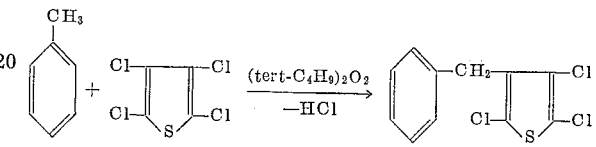

Hydrogen chloride is evolved at the condensation reaction herein described in a quantity of one molecular proportion of hydrogen chloride per one molecular proportion of the desired reaction product. In cases where it is desirable to avoid radical changes in pH during the course of the reaction, smaller amounts of materials which have a buffering effect in the pH will be included in the reaction mixture. For example, an alkaline pH can be maintained by the use of buffers such as borax, disodium phosphate, sodium carbonate, ammonium carbonate, sodium acetate, etc.

Examples of aralkyl polyhalothiacyloolefins which contain an aralkyl group on one of the doubly-bonded carbon atoms and chlorine atoms on all other doubly-bonded carbon atoms which may be prepared according to the process of this invention include 2-benzyl-3-chloro-4,5-dihydrothiophene,
3-benzyl-2-chloro-4,5-dihydrothiophene,
2-benzyl-3,4,5-trichlorothiophene,
3-benzyl-2,4,5-trichlorothiophene,
2-(1-phenylethyl)-3,4,5-trichlorothiophene,
2-(1-phenylpropyl)-3,4,5-trichlorothiophene,
2-(p-methylbenzyl)-3,4,5-trichlorothiophene,
2-(o-methylbenzyl)-3,4,5-trichlorothiophene,
2-(m-methylbenzyl)-3,4,5-trichlorothiophene,
3-benzyl-2,4,5,6-tetrachloro-4H-thiopyran,
6-benzyl-2,3,4,5-tetrachloro-4H-thiopyran,
6-benzyl-2,3,5-trichloro-4H-thiopyran,
6-(1-phenylethyl)-2,3,5-trichloro-4H-thiopyran,
6-(1-phenylpropyl)-2,3,5-trichloro-4H-thiopyran,
6-(p-methylbenzyl)-2,3,5-trichloro-4H-thiopyran,
6-(o-methylbenzyl)-2,3,5-trichloro-4H-thiopyran,
6-(m-methylbenzyl)-2,3,5-trichloro-4H-thiopyran,
6-benzyl-3,4,5-trichloro-2H-thiopyran,
6-(1-phenylethyl)-3,4,5-trichloro-2H-thiopyran,
6-(1-phenylpropyl)-3,4,5-trichloro-2H-thiopyran,
6-(p-methylbenzyl)-3,4,5-trichloro-2H-thiopyran,
6-(o-methylbenzyl)-3,4,5-trichloro-2H-thiopyran,
6-(m-methylbenzyl)-3,4,5-trichloro-2H-thiopyran,
6-benzyl-2,3,4,5-tetrachloro-2H-thiopyran,
6-benzyl-5-chloro-3,4-dihydro-2H-thiopyran, etc.

It is to be understood that the aforementioned compounds are only representatives of the class of compounds which may be used and that the process of the present invention may not be necessarily limited thereto.

The following examples are given to illustrate the process of the present invention which, however, are not intended to limit the generally broad scope of the present invention in strict accordance therewith.

Example I

In this example a mixture of 31 grams of tetrachlorothiophene, 11 grams of di-tert-butyl peroxide and 100 grams of toluene was charged to a glass liner of a rotating autoclave. The autoclave was then sealed and nitrogen pressed in until an initial pressure of 30 atmospheres had been reached. Heating of the autoclave was initiated and continued until a temperature of about 130°–140° C. was reached, this tempreature was maintained for a period of 4 hours during which time the maximum pressure reached 48 atmospheres. At the end of this time the heating was discontinued and the autoclave and contents thereof were allowed to cool to room temperature. The excess pressure was vented and the contents of the autoclave after nutralization of the hydrogen chloride produced by means of the addition of an alkaline substance, were transferred into a distilling flask for recovery of unreacted starting materials and the desired reaction product. The reaction mixture was subjected to fractional distillation under reduced pressure and the cut boiling at 131° to 138° C. at 0.55 to 0.75 mm. pressure was recovered. This material comprising 3-benzyl-2,4,5-trichlorothiophene (and isomeric 2-benzyl-3,4,5-trichlorothiophene) had a refractive index $n_D^{23}$ of 1.6090. The nuclear magnetic resonance spectrum of the product indicated that there was a condensation product of the two reactants and was in agreement with 3-benzyl-2,4,5-trichlorothiophene. In addition the material was subjected to anaylsis with the following results.

Calculated for $C_{11}H_7Cl_3S$: Cl, 38.32; S, 11.55. Found: Cl, 37.0; S, 11.35.

Example II

In this example equal molecular proportions of p-xylene and 2,3,4,5-tetrachlorothiophene along with a free radical generating catalyst comprising di-tert-butyl peroxide are placed in a rotating autoclave. The autoclave is sealed and nitrogen pressed in until an initial pressure of 30 atmospheres is reached. The autoclave and contents thereof are heated to a temperature in the range of from about 130° to 140° C. and maintained thereat for a period of about 4 hours. At the end of this time, the autoclave and contents thereof are cooled to room temperature and the excess pressure is vented. The contents of the autoclave after neutralization of the hydrogen chloride produced are subjected to fractional distillation under reduced pressure. The cut comprising 3-(p-methylbenzyl)-2,4,5-trichlorothiophene is separated and recovered.

Example III

In this example equal molecular proportions of toluene and 2,3,4,5,6-pentachloro-4H-thiopyran along with di-tert-butyl peroxide are treated in a manner similar to that set forth in Example I above. Upon completion of the desired residence time, the contents of the autoclave are recovered in a manner similar to that hereinbefore set forth and subjected to fractional distillation under reduced pressure, the desired 3-benzyl-2,4,5,6-tetrachloro-4H-thiopyran being separated and recovered.

Example IV

A mixture of p-xylene, 2,3,4,5,6-pentachloro-4H-thiopyran and di-tert-butyl peroxide is placed in the glass liner of a rotating autoclave. The liner is sealed into the autoclave and nitrogen pressed in until an initial pressure of 30 atmospheres is reached. Following this the autoclave and contents thereof are heated to a temperature in the range of from about 130° to 140° C. and maintained thereat for a period of about 4 hours. At the end of this time the autoclave and contents thereof are allowed to cool to room temperature, the excess pressure is vented and the reaction product recovered. The reaction product is neutralized by the addition of an alkaline substance and subjected to fractional distillation under reduced pressure. The cut comprising 3-(p-methylbenzyl)-2,4,5,6-tetrachloro-4H-thiopyran is separated and recovered.

Example V

A mixture of propylbenzene, 2,3,4,5-tetrachlorothiophene and di-tert-butyl peroxide is placed in an autoclave and nitrogen pressed in until an initial pressure of about 30 atmospheres is reached. The autoclave and contents thereof are then heated to a temperature in the range of from about 130° to 140° C. and maintained thereat for about 4 hours. At the end of this time the procedure described in Example I above is followed and the desired product comprising 3-(1-phenylpropyl)-2,4,5-trichlorothiophene is separated and recovered.

I claim as my invention:

1. A process for the preparation of an aralkyl polyhalothiacycloolefin which comprises condensing an alkyl aromatic compound containing at least one hydrogen atom on an alpha-carbon atom of a saturated carbon atom attached to the aromatic nucleus with a polyhalothiacycloolefin containing chlorine atoms on all doubly-bonded carbon atoms in the presence of an organic peroxide catalyst at a pressure of from about atmospheric to about 100 atmospheres and a temperature of from about 50° to about 300° C., and recovering the desired aralkyl polyhalothiacycloolefin.

2. A process for the preparation of an aralkyl polyhalothiacycloolefin which comprises condensing an alkyl aromatic hydrocarbon containing at least one hydrogen atom on an alpha-carbon atom of a saturated carbon atom attached to the aromatic nucleus with a polyhalothiacycloolefin containing chlorine atoms on all doubly-bonded carbon atoms in the presence of an organic peroxide catalyst at a pressure in the range of from about atmospheric to about 100 atmospheres and at a temperature in the range of from about 50° to about 300° C., said temperature being at least as high as the decomposition temperature of said catalyst, and recovering the desired aralkyl polyhalothiacycloolefin.

3. A process for the preparation of an aralkyl polyhalothiacycloolefin which comprises condensing toluene with a polyhalothiacycloolefin containing chlorine atoms on all doubly-bonded carbon atoms in the presence of an organic peroxide catalyst at a pressure in the range of from about atmospheric to about 100 atmospheres and at a temperature in the range of from about 50° to about 300° C., said temperature being at least as high as the decomposition temperature of said catalyst, and recovering the desired aralkyl polyhalothiacycloolefin.

4. A process for the preparation of an aralkyl polyhalothiacycloolefin which comprises condensing p-xylene with a polyhalothiacycloolefin containing chlorine atoms on all doubly-bonded carbon atoms in the presence of an organic peroxide catalyst at a pressure in the range of from about atmospheric to about 100 atmospheres and at a temperature in the range of from about 50° to about 300° C., said temperature being at least as high as the decomposition temperature of said catalyst, and recovering the desired aralkyl polyhalothiacycloolefin.

5. A process for the preparation of an aralkyl polyhalothiacycloolefin which comprises condensing ethylbenzene with a polyhalothiacycloolefin containing chlorine atoms on all doubly-bonded carbon atoms in the presence of an organic peroxide catalyst at a pressure in the range of from about atmospheric to about 100 atmospheres and at a temperature in the range of from about 50° to about 300° C., said temperature being at least as high as the decomposition temperature of said catalyst, and recovering the desired aralkyl polyhalothiacycloolefin.

6. A process for the preparation of an aralkyl polyhalothiacycloolefin which comprises condensing a propylbenzene with a polyhalothiacycloolefin containing chlorine atoms on all doubly-bonded carbon atoms in the presence of an organic peroxide catalyst at a pressure in the range of from about atmospheric to about 100 atmospheres and at a temperature in the range of from about 50° to about 300° C., said temperature at least as high as the decomposition temperature of said catalyst, and recovering the desired aralkyl polyhalothiacyclo-olefin.

7. A process for the preparation of an aralkyl polyhalothiacycloolefin which comprises condensing an alkyl aromatic compound containing at least one hydrogen atom on an alpha-carbon atom of a saturated carbon atom attached to the aromatic nucleus with 2,3,4,5-tetrachlorothiophene in the presence of an organic peroxide catalyst at a pressure in the range of from about atmospheric to about 100 atmospheres and at a temperature in the range of from about 50° to about 300° C., said temperature being at least as high as the decomposition temperature of said catalyst, and recovering the desired aralkyl trichlorothiophene.

8. A process for the preparation of an aralkyl polyhalothiacycloolefin which comprises condensing an alkyl aromatic compound containing at least one hydrogen atom on an alpha-carbon atom of a saturated carbon atom attached to the aromatic nucleus with 2,3,4,5,6-pentachloro-4H-thiopyran in the presence of an organic peroxide catalyst at a pressure in the range of from about atmospheric to about 100 atmospheres and at a temperature in the range of from about 50° to about 300° C., said temperature being at least as high as the decomposition temperature of said catalyst, and recovering the desired aralkyl tetrachloro-4H-thiopyran.

9. A process for the preparation of an aralkyl polyhalothiacycloolefin which comprises condensing toluene with 2,3,4,5-tetrachlorothiophene in the presence of di-tert-butyl peroxide at a temperature in the range of from about 100° to about 150° C. and at a pressure in the range of from atmospheric to about 100 atmospheres, and recovering the desired 3-benzyl-2,4,5-trichlorothiophene.

10. A process for the preparation of an aralkyl polyhalothiacycloolefin which comprises condensing p-xylene with 2,3,4,5-tetrachlorothiophene in the presence of di-tert-butyl peroxide at a temperature in the range of from about 100° to about 150° C. and at a pressure in the range of from atmospheric to about 100 atmospheres, and recovering the desired 3-(p-methylbenzyl)-2,4,5-trichlorothiophene.

11. A process for the preparation of an aralkyl polyhalothiacycloolefin which comprises condensing toluene with 2,3,4,5,6-pentachloro-4H-thiopyran in the presence of di-tert-butyl peroxide at a temperature in the range of from about 100° to about 150° C. and at a pressure in the range of from atmospheric to about 100 atmospheres, and recovering the desired 3-benzyl-2,4,5,6-tetrachloro-4H-thiopyran.

12. A process for the preparation of an aralkyl polyhalothiacycloolefin which comprises condensing p-xylene with 2,3,4,5-tetrachlorothiophene in the presence of di-tert-butyl peroxide at a temperature in the range of from about 100° to about 150° C. and at a pressure in the range of from about atmospheric to about 100 atmospheres, and recovering the desired 3-(p-methylbenzyl)-2,4,5,6-tetrachloro-4H-thiopyran.

13. A process for the preparation of an aralkyl polyhalothiacycloolefin which comprises condensing propylbenzene with 2,3,4,5-tetrachlorothiophene in the presence of di-tert-butyl peroxide at a temperature in the range of from about 100° to about 150° C. and at a pressure in the range of from about atmospheric to about 100 atmospheres, and recovering the desired 3-(1-phenylpropyl)-2,4,5-trichlorothiophene.

14. An aralkyl polychlorothiacycloolefin containing from 4 to 5 carbon atoms in the cycloolefin ring and in which there is an aralkyl group on a doubly-bonded carbon atom and chlorine atoms on all other doubly-bonded carbon atoms.

15. 3-benzyl-2,4,5-trichlorothiophene.
16. 3-(p-methylbenzyl)-2,4,5-trichlorothiophene.
17. 3-benzyl-2,4,5,6-tetrachloro-4H-thiopyran.
18. 3 - (p - methylbenzyl) - 2,4,5,6 - tetrachloro - 4H-thiopyran.
19. 3-(1-phenylpropyl)-2,4,5-trichlorothiophene.

References Cited by the Examiner

UNITED STATES PATENTS

| 2,563,073 | 8/1951 | Schmerling | 260—332.5 |
| 2,623,049 | 12/1952 | Norris | 260—332.5 |
| 3,056,793 | 10/1962 | Luvisi | 260—290 |

OTHER REFERENCES

Hartough: Thiophene and Its Derivatives, Interscience Pub. Inc., N.Y. (1952), page 145.

WALTER A. MODANCE, *Primary Examiner.*

JAMES A. PATTEN, *Assistant Examiner.*